Sept. 26, 1939.    W. A. GOODCHAP    2,173,836
VEHICLE BRAKE MECHANISM
Filed May 7, 1937    2 Sheets-Sheet 1
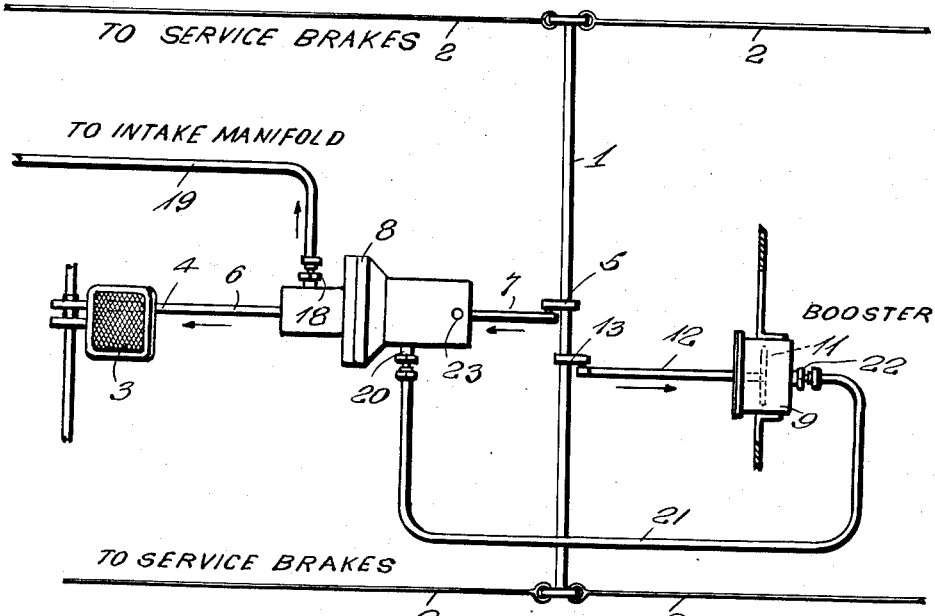
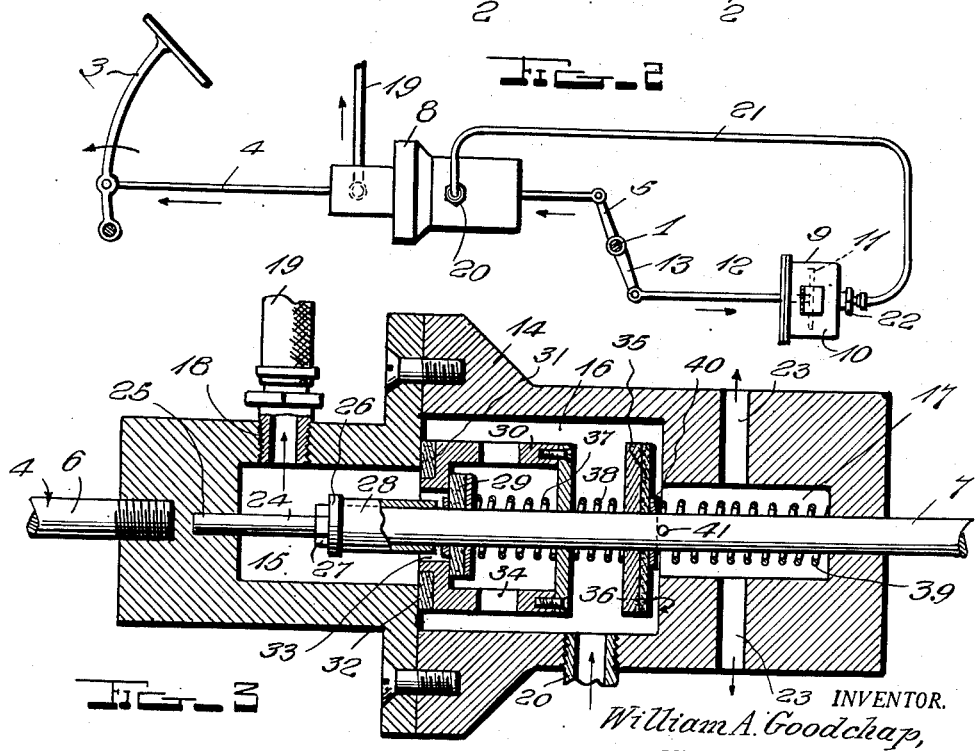
INVENTOR.
William A. Goodchap,
BY
, ATTORNEY.

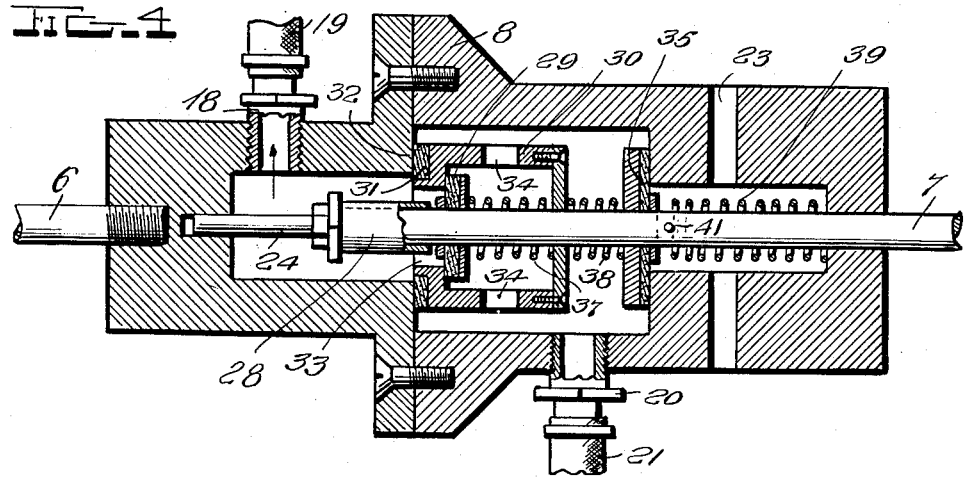
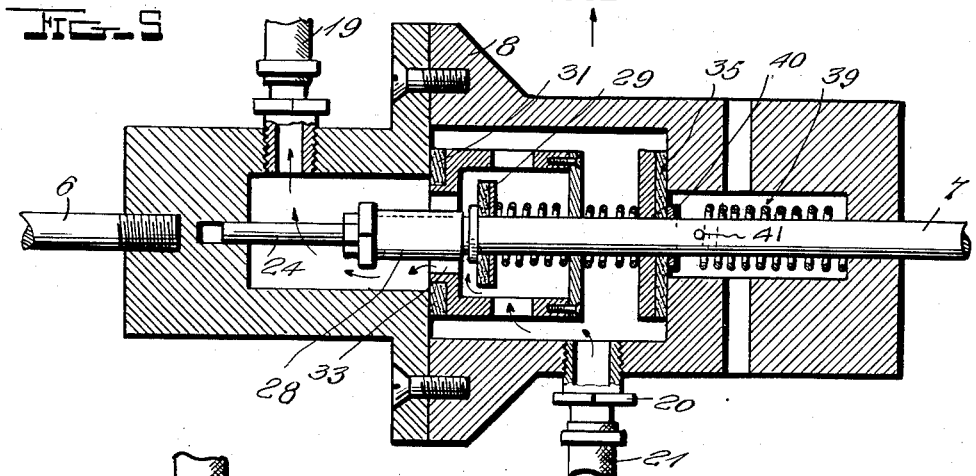
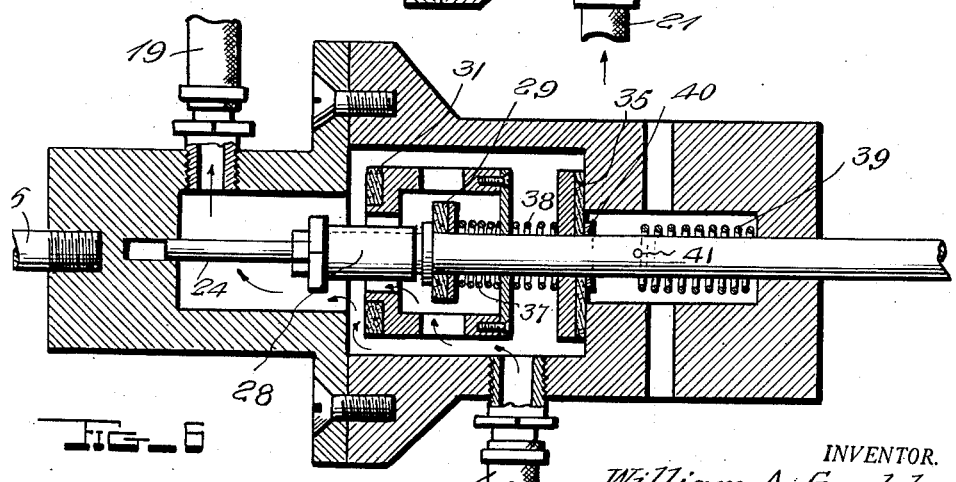

Patented Sept. 26, 1939

2,173,836

UNITED STATES PATENT OFFICE 2,173,836

VEHICLE BRAKE MECHANISM

William A. Goodchap, Claremont, Calif.

Application May 7, 1937, Serial No. 141,369

15 Claims. (Cl. 188—152)

This invention relates to improvements in brake mechanisms for automobiles and like vehicles, and particularly to means for use in a mechanical brake system for bringing into play, in certain braking actions, an auxiliary force to increase the force of the braking action.

One object of the invention is to provide means for use in a brake pedal or other suitably operated system of mechanical brakes whereby, under a certain degree or degrees of movement of the brake pedal or other operator, a power device, such as a vacuum or other fluid pressure actuated booster or motor, may be brought into action to increase the rapidity and force of braking pressure of the brakes.

Another object of the invention is to provide a means of the character described, in the form of a graduatively acting valve device governing the extent of the vacuum or fluid pressure action on the booster or motor, whereby the action of the brakes may be controlled to produce different braking forces.

Still another object of the invention is to provide a valve device of the character described which forms a lost-motion working connection in the brake operating line whereby not only the braking force of the pedal but also auxiliary power forces may be applied to the brake mechanism to secure desired service as well as emergency applications of the brakes.

Still another object of the invention is to provide a device of the character described which allows a mild mechanical force to be applied to the brakes for gentle service actions and combined manual and auxiliary power forces of different degrees to be applied to secure harder service and emergency brake applying actions.

Still another object of the invention is to provide a device which allows the brakes to be applied with maximum force when desired, or, in other words, to grab, when the brake pedal is moved to the limit of its brake applying motion, but which, at the same time, allows the operator to secure a rapid and forcible application of the brakes without grabbing by proper manipulation of the brake pedal.

Still another object of the invention is to provide a device of the character described which is simple of construction, reliable and efficient in action, and adapted to be applied to any conventional type or system of mechanical brakes at a low cost.

With these and other objects in view, the invention consists of the features of construction, combination and arrangement of parts, hereinafter fully described and claimed, reference being had to the accompanying drawings, in which:

Fig. 1 is a diagrammatic plan view showing the application of the invention to related parts of a brake system.

Fig. 2 is a side elevation of the same.

Fig. 3 is a central, vertical, longitudinal section through the device constituting my invention, showing the parts thereof as they appear in normal position or in the released condition of the brakes.

Figs. 4, 5 and 6 are views similar to Fig. 3, showing the position of the parts of the device as they appear in different braking actions.

Referring now more particularly to the drawings, 1 designates a brake operating rock shaft to which are operative coupled rods 2 which lead in practice to the brake drums of the vehicle for applying braking motions to the brake shoes or bands. This shaft 1 is suitably coupled to a foot pedal 3 or other primary brake applying element or means for operation thereby. In normal practice the connection between the shaft 1 and pedal 3 comprises a brake actuating link rod 4 coupled to a crank arm 5 on the shaft. In carrying my invention into practice, this rod 4 is preferably divided into two sections 6 and 7, between which is interposed and to which is coupled the motion transmitting and controlling device 8 constituting my invention. For use in association with these parts there is also employed a differential pressure operated power device 9, such as a vacuum or fluid pressure operated motor or booster. This motor or booster, as shown, comprises a casing 10 in which is disposed a movable pressure actuated piston or diaphragm 11 connected by a rod 12 with a crank arm 13 on the shaft 1, whereby power brake applying actions may also be applied to said shaft.

The device 8 is in the form of a lost motion coupling connection between the shaft sections 6 and 7, which connection is adapted for tranmitting brake applying motions from the pedal to the shaft 1 and is provided with valve means governing the application of vacuum or fluid pressure to the motor or booster 9 for applying power forces of different degrees to the shaft 1 for different braking actions.

In the illustrated embodiment the device 8 comprises a casing 14 having chambers or passages 15, 16 and 17, the foremost chamber 15 being in communication at its rear end with the forward portion of the chamber 16, and the chamber 16 being in communication at its rear end with the chamber or passage 17. The chamber or passage 15 is provided with a nipple or other connection 18 to which is connected a pipe or tube 19 which leads in practice to the intake manifold of the automobile engine or other vacuum or fluid pressure producing source. The chamber 16 is also provided with a nipple connection 20 to which is coupled one end of a pipe or tube 21 similarly coupled at its opposite end to a nipple connection 22 communicating with the chamber or casing of the motor or booster 10 at the side of the piston opposite that to which the rod 12 is connected. The chamber 17 communicates at a suitable point with one or more intake and exhaust passages 23 connecting it with the external atmosphere.

The casing 14 is fixedly connected in any suitable manner at its forward end to the rear end of the rod section 6, and said casing is suitably bored at its rear end to slidably receive and engage the rod section 7, which section 7 extends axially into the casing and within the passages 15, 16 and 17 thereof.

At its forward end the rod section 7 is formed with a reduced guide stem 24 which engages a guide recess 25 in the forward end of the casing. At the point of juncture of the main or body portion of the rod section 6 with said reduced stem 24, the rod is formed with a shoulder against which bears an abutment head or washer 26 held in position by a retaining nut 27. A sleeve 28 abuts at its forward end against this head 26 and is of a length such that in the normal position of the parts shown in Fig. 3 the rear end of the sleeve lies adjacent to but spaced from a valve member 29. This valve member 29 is slidably mounted on the rod section 7 within a valve cage 30, also slidably mounted on said rod section 7. The forward portion of the valve cage 30 is suitably constructed to form a valve member 31 which normally abuts against the seat 32 to close communication between the passages 15 and 16. The said forward portion of the cage 30 is also formed with a port 33 bounded by the valve member 31 and which is normally closed by the valve member 29. In the cage 30 are formed ports 34 for establishing communication between the interior of the cage and the chamber 16 and communication between said chamber 16 and the chamber 15 to the port 33 when the valve 29 is open. A third valve 35 is slidably mounted on the rod section 7 and in the chamber 16 between the rear of the cage 30 and a seat surface 36 through which the forward end of the passage 17 opens, against which seat surface 36 the valve 35 is adapted to close to cut off communication between the chambers 16 and 17. A spring 37 disposed in the cage 30 between the valve 29 and rear end of the cage acts to yieldingly hold the valve 29 closed and to permit it to be opened. A spring 38 disposed between the rear end of the cage 30 and the valve 35 tends to hold the valve member 35 from forward movement and to press the cage 30 forward to hold the valve member 31 closed against its seat 32. A third spring 39 is disposed in the chamber or passage 17 between the rear end wall of said chamber and the valve member 35 and bears against an abutment washer 40 engaging the rear surface of said valve member. A pin 41 passing through the shaft section 7 engages the abutment plate or washer 40 to limit the rearward movement of the abutment washer and valve 35 on the rod section 7 while permitting them to have forward movement thereon to a limited extent governed by the opposing pressures of the springs. The springs 37, 38 and 39 conjointly operate to normally hold the parts of the device 8 and the rod section 7 in the normal position shown in Fig. 3 and to provide a yielding elastic connection between the rod section 6 to which the device 8 is fixedly connected and the rod section 7 for lost motion movements therebetween whereby different operations of the brake mechanism are effected in the manner hereinafter described. The springs 37, 38 and 39 further serve to yieldingly hold the respective valves normally in closed position and to permit them to open to control the brake applying actions transmitted through the operations of the brake pedal and the booster. Spring 38 is stronger than spring 37 and spring 39 is stronger than spring 38 in order that the valves may be maintained in proper relative position when the brake pedal is released and the parts in normal position shown in Fig. 3, as well as to adapt the valves to operate in proper sequence. Pin 41 is so positioned that in such normal position of the parts it adapts valve 35 to be held unseated by force of spring 39 but limited in its opening movement under resistance of spring 38.

Fig. 3, as stated, shows the normal position of the brake pedal 3, device 8 and booster 9 in the fully released position of the brakes. In this position of the parts the valves 29 and 31 are closed to cut off communication between the booster and the intake manifold, while the valve 35 is opened to connect the booster chamber with the atmosphere through the vent ports 23 in order to allow free and unimpeded movements of the piston or diaphragm 11 therein.

Fig. 4 shows the position of the parts of the lost motion valve device 8 when the brake pedal 3 is depressed gently for applying a certain degree of pressure to the brakes, sufficient in practice for speed checking actions. When the pedal 3 is depressed the device 8 is drawn forward with the rod section 6 against the resistance of the spring 39 until the valve 35 is closed against its seat 36, the section 7 being then coupled to the section 6 for a mechanical brake applying action of a certain degree. In this action, and unless further pressure is exerted on the brake pedal, the valves 29 and 31 remain closed so that only the pedal applying pressure is transmitted, the booster being out of action.

Fig. 5 shows the service action effect on a greater brake applying movement of the pedal, in which the device 8 is drawn forwardly to a sufficient degree to transmit a greater degree of brake applying movement from the pedal to the brakes and to open the graduating valve 29. When this valve is opened it uncovers the port 33, thus forming a restricted connection between the chamber 15 communicating with the intake manifold and the booster or motor 9, whereby a certain amount of vacuum pull is exerted on the piston or diaphragm 11 to apply through the rod 12 and crank 13 a power action of a certain degree, supplementing that transmitted by the brake pedal, to apply the brakes with force sufficient for ordinary service operations.

Fig. 6 shows the operation of the device for an emergency brake applying action, as when the pedal is pressed hard down. In this action the device 8 is moved forward to a greater degree, so that the emergency valve 31 as well as the service valve 29 are opened to establish unrestricted communication between the intake manifold and the booster or motor 9, so that a maximum vacuum pull will be exerted on the piston or diaphragm 11 to increase the rapidity of the brake applying action and to supplement the force applied by the pedal to apply the brakes for an emergency stop.

On the release of the pedal and its return to normal position, at the end of each of these brake applying actions, the springs return the working parts to the normal position shown in Fig. 3, spring 39 acting at the limit of the return movement of the parts by its pressure on pin 41 to move rod section 7 fully forward to seat stem 24 in recess 25 and cause pin 41 to return valve 35 to the vent position shown in Fig. 3, thus establishing a vent connection between the booster 9 and the atmosphere and allowing a full release of the brakes to take place.

The above gives a general description of the operation of the device. A special feature of my invention, however, resides in the fact that the lost motion valve device not only allows very rapid application of brakes and their application with maximum force on full depression of the pedal, in which grabbing of the brakes may occur, but it also allows rapid application of the brakes with sufficient force for a quick stop on depression of the pedal to a certain degree, without grabbing of the brakes, and with a continued but slowing up of the brake applying action. In either of these actions the brakes will be held by the lost motion valve device applied as long as the pedal is held depressed. The mode of operation of the brakes through the action of the lost motion valve device when the pedal is depressed to its maximum position will be readily understood without further description. Whenever the operator desires a quick and forcible application of the brakes for a quick stop without grabbing, the pedal is depressed to a certain degree and held in this position. The pull on the rod section 6 thus occurring moves the casing of the lost motion valve device forward from the normal position shown in Fig. 3 until the lost motion of sleeve 28 is taken up, during which action valve 35 closes, and on the continued movement of the valve casing valve 29 is first opened and valve 30 then opened for the application of maximum vacuum to the booster 9. The parts in these actions will first take the position shown in Fig. 5 and then the position shown in Fig. 6. The holding of the brake pedal in the brake applying position noted maintains the valve casing in the forward position to which it has been adjusted thereby, that is, the position shown in Fig. 6. As the booster 9 operates in addition to the manual brake applying force to apply the brakes, the arm 5 attached to the brake applying shaft 1 and to which the rod section 7 is connected, will move said rod section 7 forward in the lost motion valve casing with the result that the valve 30 will be gradually moved to closed position, during which there will be a continually applied but gradually reduced brake applying pressure. This forward movement of rod 7 will continue until it reaches the position shown in Fig. 4 and effects the closing of the valve 29 at a time when the brakes are fully applied with the graduated force desired. At this time the rod section 7 will have nearly but not quite reached its normal position, but will reach a position in which all three valves 29, 30 and 35 are closed, whereby, as long as the pedal is held depressed, the brakes will remain applied. Upon the release of the brake pedal the brake rods 6 and 7, together with the valve casing, will be returned to normal position in which valves 29 and 30 will remain closed but valve 35 will be opened for an admission of air to break the vacuum in the booster, allowing the diaphragm or piston therein to return to normal position. Hence it will be seen that in securing a quick and forcible brake applying action without grabbing the valves 29 and 31 will be opened for a quick brake applying action of a certain degree of force, after which a continued but gradually reduced brake applying force will be applied due to the forward movement of the rod section 7 until the valves are closed to hold the brakes applied, as shown in Fig. 4, the large vacuum valve 31 closing before the smaller vacuum valve 29, causing the booster to slow down the brake applying action due to the successive closing of these valves. This makes possible an automatic slowing down of the brake application force after the brakes have taken air to prevent an unduly sudden or grabbing brake action. It will be noted that in the described movements of the rod 7 the pin 41 shifts therewith to allow proper relative movements between said rod section 7 and the valve 35.

From the foregoing description, taken in connection with the drawings, the construction and mode of operation of my improved braking means will be readily understood, and it will be seen that the invention provides a lost motion valve device adapted for cooperation with a booster or other like power device whereby pedal braking pressure or pedal braking pressure supplemented by power pressures of different degrees may be transmitted to the brakes to apply them gently or with medium force or quickly and with a high degree of force for an emergency braking action, as circumstances may require in the operation of an automobile at different times. The addition of the lost motion valve device operating in conjunction with the booster not only provides a means for securing accurate braking actions but also means for securing greater rapidity of operation of the brakes, whether applied with medium or full force. It will be evident that the invention provides a simple, reliable and efficient type of lost motion valve device for the purposes set forth which may be manufactured at a comparatively low cost and readily applied to any conventional type of mechanical brake system. While the structure disclosed is preferred, it will, of course, be understood that changes in the form, construction and arrangement of the parts may be made within the scope of the appended claims without departing from the spirit or sacrificing any of the advantages of the invention.

What I claim is:

1. In a brake mechanism for vehicles having a brake rigging, a primary brake operating element, and a motion transmitting connection between the same and the brake rigging, and having also a source of vacuum and a vacuum operated brake applying device for transmitting motion to the brake rigging, valves in said motion transmitting connection controlling communication between the source of vacuum and the vacuum operated brake applying device, said valves being successively operative in the brake applying movement of the brake operating element to respectively establish ports of communication of relatively small and larger sizes between the source of vacuum and the vacuum operated brake applying device in predetermined brake applying positions of said brake applying element.

2. In a brake mechanism for vehicles having a primary brake operating element for transmitting power to apply the brakes, a power device for applying the brakes, and a lost motion transmitting connection between said brake applying element and the power device and the brake mechanism for applying power to operate the brakes on a predetermined movement of the brake applying device, a power control device in said lost-motion connection between the brake operating element and the brake mechanism including power control members successively thrown into action on different degrees of brake applying movement of the brake operating element for throwing the power device into brake applying action with increasing forces.

3. In a brake mechanism for vehicles having a primary motion transmitting element for applying the brakes, and an auxiliary fluid pressure operated device for applying the brakes, valve means connected to an operable in the brake applying movements of the motion transmitting element and including valve members serially operated to apply different degrees of fluid pressure force to the fluid pressure operated brake applying device for relatively low and high power brake applying actions at different points in the movement of said motion transmitting element.

4. In a brake mechanism for vehicles having a brake rigging, a primary motion transmitting element for imparting brake applying motion to the brake rigging, a source of vacuum, a vacuum operated brake applying device for imparting brake applying motion to the brake rigging, and a connection between the brake rigging and the primary motion transmitting element, a valve device coupled to said connection and governed in action by the primary motion transmitting element, said valve device embodying a valve member operated on a partial brake applying movement of the motion transmitting element to open up a small port of communication between the source of vacuum and the vacuum operated brake applying device for a braking action of a certain degree of force, and a valve member operated on a further brake applying movement of the primary motion transmitting element for opening up a larger port of communication between the source of vacuum and the vacuum operated brake applying device for a braking action of a higher degree of force.

5. In a brake mechanism for vehicles having a primary motion transmitting element for applying the brakes, a differential pressure producing source, a differential pressure operated brake applying device, and a motion transmitting connection between the brake rigging of the brake mechanism and the motion transmitting element, a service valve in said connection operative on a preliminary traverse of the motion transmitting element to control communication between the differential pressure producing source and the fluid pressure operated brake applying device to effect the application of the brakes with a certain degree of force, and an emergency valve in said connection operatively on a further traverse of the motion transmitting element to control communication between the differential pressure producing source and the fluid pressure operated brake applying device to effect the application of the brakes with a higher degree of force.

6. In a brake mechanism for vehicles having a source of vacuum, a primarily operable brake applying device for transmitting motion to the brake rigging of the brake mechanism, a vacuum operated brake applying device, and motion transmitting means between the brake rigging of the brake mechanism and the primarily operable brake applying device embodying a lost motion connection including a valve casing and valves in said casing successively operative under different brake applying movements of the primarily operable brake applying device to control the application of vacuum to the vacuum operated brake applying device to apply the brakes with different degrees of brake applying force.

7. In a vehicle having a brake mechanism for vehicles provided with a primarily operable brake applying device for transmitting brake applying motion to the brake rigging, and a fluid pressure operated brake applying device, said devices being operatively connected with the brake rigging, the operating means between the brake rigging and the primarily operable brake applying device embodying a lost motion connection including a valve casing, relatively low and high power supplying valve elements in said casing successively operative at different points in the brake applying motion of the primarily operable brake applying device to respectively and conjointly control the application of fluid pressure to the fluid pressure operated brake applying device to apply the brakes with relatively low and high degrees of force.

8. In a brake mechanism for vehicles having a fluid pressure operated brake device, a primarily operable brake applying device, and a sectional brake rod between the primarily operable brake applying device and the brake embodying a lost motion connection between said rod sections including a valve casing, a ported valve in said casing governing the application of fluid pressure to the fluid pressure operated brake applying device to cause it to apply the brakes with a high degree of force at a predetermined point in the range of the brake applying movement of the primarily operable brake applying device, and a valve in said casing controlling a port in the first-named valve for governing the application of fluid pressure to the fluid pressure operated brake applying device to operate the brakes with less force, said valve being opened at a point in the range of movement of the primarily operable brake applying device before the first-named valve is opened.

9. In a brake mechanism for vehicles having a source of vacuum, a brake actuating shaft, a primarily operable brake applying device, a vacuum operated brake applying device, a connection between the primarily operable brake applying device and the shaft comprising rod sections, and a lost motion connection between said rod sections including a valve casing, a service valve in said casing, and an emergency valve in said casing, said valves being successively operated under different degrees of brake applying movement of the primarily operable brake applying device and relative movements between the parts of the lost motion connection for establishing relatively low and high degrees of vacuum communication between the vacuum operated brake applying device and the source of vacuum to effect the power operation of the brakes with different degrees of force.

10. In a vehicle having a source of vacuum, a brake actuating rock shaft, a vacuum operated brake applying device coupled to said shaft, a brake applying element, and a motion transmitting connection between the brake applying element and the shaft comprising rod sections and a coupling between the same including a valve casing fixed to one of the rod sections and yieldingly connected with the other rod section, said casing having ports and passages for connecting the vacuum operated brake applying devise with a source of vacuum, a ported emergency valve in said casing for establishing a wide port of communication between the source of vacuum and the vacuum operated brake applying device for a quick high power application of the brakes, and a service valve in said casing controlling the port in the emergency valve for a slower, lower power application of the brakes, said service and emergency valves being successively opened at different points in the brake applying motion of the brake applying element and closing in reverse order on a brake releasing action.

11. In a vehicle having a brake mechanism, a manually operable prime mover for transmitting mechanical force to apply the brakes, motion transmitting means connected to said prime mover for transmitting the motion therefrom to the brake mechanism, and a power device for actuating the brake mechanism, power control devices in the line of connection between the prime mover and motion transmitting member successively operated on predetermined progressive movements of the prime mover to control the application of power to the power device to apply relatively low and high degrees of braking force to the brake mechanism.

12. In a vehicle having a brake mechanism, a differential pressure producing source, a brake operating shaft, a brake applying element, a differential pressure operated booster coupled to the shaft, a brake rod formed of sections, one connected to the brake applying element and the other to the shaft, a motion transmitting device between said rod sections comprising a casing fixed to the first-named rod section and slidingly receiving the second-named rod section, spring means yieldingly connecting the second-named rod section to the casing, and control valves in said casing governed by said spring means and the relative movements of the rod sections in a brake applying movement of the brake applying element and successively operated at different points in such movement of the brake applying element to establish ports of communication of different sizes between the differential pressure producing source and the booster for power applications of relatively low and high degrees to the power operated booster.

13. In a vehicle having a brake mechanism, a vacuum source, a brake operating shaft, a brake applying element, a vacuum operated booster coupled to the shaft, and a brake rod formed of sections, one connected to the brake brake applying element and the other to the shaft, a motion transmitting device between said rod sections comprising a casing fixed to the first-named rod section and slidingly receiving the second-named rod section, spring means yieldingly connecting the second-named rod section to the casing, said casing having ports and passages connected with the booster and a vacuum source, and relatively low and high power control valves in said casing governed by said spring means and the movement of the casing and relative movements of the rod sections for operation successively at different points in a brake applying movement of the brake applying element to control said ports and passages for power operation of the booster for brake applications of different forces.

14. In a brake mechanism for vehicles having a brake rigging, a vacuum source, a brake applying device, a vacuum operated brake actuating device, and motion transmitting means connecting said brake applying element with the brake rigging for brake applying actions, said means embodying rod sections having a lost motion connection including a valve casing, a valve in said casing operated on a predetermined brake applying movement of the brake applying element for establishing a restricted vacuum connection between the vacuum source and the vacuum operated brake device for power operation of the brakes with a certain degree of rapidity and force, and a valve in said casing operable on the further movement of the brake applying element for establishing a greater vacuum connection between the source of vacuum and the vacuum operated brake applying device for applying the brakes with a greater degree of rapidity and force.

15. In a vehicle brake mechanism having a vacuum producing source, a primary brake applying device, and a vacuum operated booster for applying the brakes, a control valve device controlled by the movements of the primary brake applying device for controlling the action of the brakes, said valve device comprising a valve member movable to open position on a predetermined brake applying movement of the brake applying device to establish a portion of communication of small area between the vacuum producing source and the booster to effect an application of the brakes with a mild degree of force, a valve member movable to open position on a further brake applying movement of the brake applying device to establish a port of communication of larger area between the vacuum producing source and the booster to effect the application of the brakes with a greater degree of force, said valves being movable on a brake releasing action of the primary brake applying device successively to closed positions in reverse order to the order of their aforesaid opening movements, and a valve member movable to establish a vacuum relief connection between the booster and the atmosphere in the closed position of the first-named valve members and to cut off communication between the atmosphere and the booster in the open position of said valve members.

WILLIAM A. GOODCHAP.